United States Patent
Ooba et al.

(10) Patent No.: US 7,809,529 B2
(45) Date of Patent: Oct. 5, 2010

(54) REMOTE MONITORING AND DIAGNOSTIC SYSTEM

(75) Inventors: Yoshikazu Ooba, Hachioji (JP); Yoshiro Seki, Fuchu (JP); Kimito Idemori, Saitama (JP); Shuichiro Kobayashi, Tokyo (JP); Hiroyuki Oohashi, Kawasaki (JP); Katsuhiro Sumi, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 12/206,979

(22) Filed: Sep. 9, 2008

(65) Prior Publication Data

US 2009/0013311 A1 Jan. 8, 2009

Related U.S. Application Data

(63) Continuation of application No. PCT/JP2008/050290, filed on Jan. 11, 2008.

(30) Foreign Application Priority Data

Jan. 16, 2007 (JP) .............................. 2007-007293

(51) Int. Cl.
*G06F 11/00* (2006.01)

(52) U.S. Cl. .................................... 702/188
(58) Field of Classification Search .................. 702/81, 702/82, 119, 122, 123, 182–184, 188; 709/200, 709/224–226; 726/12; 717/120, 127; 463/20
See application file for complete search history.

(56) References Cited

U.S. PATENT DOCUMENTS 5,995,916 A * 11/1999 Nixon et al. ................. 702/182

FOREIGN PATENT DOCUMENTS

JP 2000-47912 2/2000

(Continued)

OTHER PUBLICATIONS

International Search Report issued by the Japanese Patent Office for International Application No. PCT/JP2008/050290 (Mar. 4, 2008).

(Continued)

*Primary Examiner*—Mohamed Charioui
(74) *Attorney, Agent, or Firm*—Finnegan, Henderson, Farabow, Garrett & Dunner, L.L.P.

(57) ABSTRACT

A center-side processing system and monitoring processing systems of monitoring objects are connected through a network. The center-side processing system includes a module for producing monitoring and diagnostic algorithms of the monitoring objects, software producing module for producing monitoring and diagnostic software from the monitoring and diagnostic algorithm, a module for producing a transmission schedule of the monitoring and diagnostic software, transmitting module for transmitting software according to the transmission schedule, a module for correcting and changing the monitoring and diagnostic software from data received from the monitoring processing system, and verification module for performing verification before the transmission of the monitoring and diagnostic software. Each of the monitoring processing systems includes a module for receiving the monitoring and diagnostic software, execution processing module for executing the monitoring and diagnostic software, a module for automatically verifying the monitoring and diagnostic software, and transmitting module.

11 Claims, 7 Drawing Sheets

FOREIGN PATENT DOCUMENTS

| | | |
|---|---|---|
| JP | 2001-282554 | 10/2001 |
| JP | 2003-50719 | 2/2003 |
| JP | 2003-114294 | 4/2003 |
| JP | 2004-5230 | 1/2004 |
| JP | 3621935 | 11/2004 |

OTHER PUBLICATIONS

Tsukui et al., "Megatrend in Supervisory/Control and Protective Relay Systems for Power Systems," Toshiba Review (1999), pp. 26-29.

Hasegawa et al., "Intranet-Based Supervisory Control System for Power Systems," Toshiba Review (1999), pp. 30-33.

Sekiguchi et al., "Power System Protection and Control System Applying Intranet Technology," Toshiba Review (1999), pp. 34-37.

International Preliminary Report on Patentability mailed Jul. 30, 2009, from the International Bureau of WIPO for corresponding International Application No. PCT/JP2008/050290 (6 pages).

* cited by examiner

REMOTE MONITORING AND DIAGNOSTIC SYSTEM

CROSS REFERENCE TO RELATED APPLICATIONS

This is a Continuation Application of PCT Application No. PCT/JP2008/050290, filed Jan. 11, 2008, which was published under PCT Article 21(2) in Japanese.

This application is based upon and claims the benefit of priority from prior Japanese Patent Application No. 2007-007293, filed Jan. 16, 2007, the entire contents of which are incorporated herein by reference.

BACKGROUND OF THE INVENTION

1. Field of the Invention

The present invention relates to a remote monitoring and diagnostic system which monitors and diagnoses many monitoring objects.

2. Description of the Related Art

Conventionally, for the remote monitoring and diagnostic system which monitors and diagnoses the remote monitoring object, there have been developed and proposed various techniques in which various remote monitoring methods are adopted. Some conventional remote monitoring and diagnostic systems will be described below.

One of the remote monitoring and diagnostic systems is an electric power system protection and control system used to perform remote operation and remote maintenance. In the electric power system protection and control system, a controller of the monitoring object and a remote monitoring center are connected through an intranet, and the monitoring is performed using a home page produced by an HTML language (for example, see Non-Patent documents 1 to 3).

In another example of the remote monitoring and diagnostic systems, the system includes a remote monitoring site, a plant control system, and a monitoring object plant. A monitoring and diagnostic program of the remote monitoring site monitors and diagnoses the monitoring object plant on the basis of data transmitted from the plant control system while cooperating with a plant control program mounted on the plant control system (for example, see Patent Document 1).

A system which remotely monitors, diagnoses, and maintains plural electric power plants can be cited as a still another example of the remote monitoring and diagnostic systems (for example, see Patent Document 2).

A scheduling method can be cited as a still another example of the remote monitoring and diagnostic systems (for example, see Patent Document 3). In the scheduling method, monitoring and diagnostic software is updated in consideration of a load status on each monitoring object, and whereby an influence of the load on the system, caused by periodically performing the repetitive monitoring of plural monitoring objects, is decreased as much as possible (for example, see Patent Document 3).

Non-Patent Document 1: "Revolutionizing electric power system monitoring, control, and protection system", Ryouichi Tsukui, Fumio Masuda, and Kuniaki Suzuki, Toshiba Review, Vol. 54, No. 6, pages 26 to 29, 1999

Non-Patent Document 2: "Intranet application electric power system monitoring and control system", Yoshio Hasegawa, Yoshiro Ebata, and Hideki Hayashi, Toshiba Review, Vol. 54, No. 6, pages 30 to 33, 1999

Non-Patent Document 3: "Intranet technology application to electric power system protection and control system", Katsuhiko Sekiguchi, Shoji Tanaka, and Yoshihiro Shirata, Toshiba Review, Vol. 54, No. 6, pages 34 to 37, 1999

Patent Document 1: Japanese Patent No. 3621935

Patent Document 2: Jpn. Pat. Appln. KOKAI Publication No. 2003-114294

Patent Document 3: Jpn. Pat. Appln. KOKAI Publication No. 2001-282554

BRIEF SUMMARY OF THE INVENTION

Among others, the monitoring objects of the remote monitoring and diagnostic systems disclosed in Non-Patent Documents 1 to 3 and Patent Documents 1 and 2 are aimed at the plant such as the electric power system, and data communication through the intranet is mainly utilized. In the system disclosed in Patent Document 3, a propose relating to update of the monitoring and diagnostic software is made on the basis of the load status on each monitoring object. However, in the case where many monitoring objects exist, it is extremely difficult that the optimum monitoring and diagnostic software is updated as an entire the system including the many monitoring objects.

There are proposed various remote monitoring and diagnostic software update and change requests. However, a specific update technique regarding many monitoring objects is not clearly described. As a result, the following problems are pointed out in the above-described system.

(1) It is difficult to previously verify the monitoring and diagnostic software.

(2) It is difficult to adapt to update triggers of various pieces of monitoring and diagnostic software.

(3) In the case where many monitoring objects are connected, it is difficult that the monitoring and diagnostic software is updated for each monitoring object.

An object of the invention is to provide a remote monitoring and diagnostic system which can previously verify the monitoring and diagnostic software, adapt to various update triggers, and efficiently update the monitoring and diagnostic software even if many monitoring objects are connected.

A first aspect of the present invention provides a remote monitoring and diagnostic system in which a center-side processing system and a plurality of monitoring processing systems which monitor and diagnose monitoring objects are connected through a communication network to monitor and diagnose each monitoring object, wherein the center-side processing system includes:

first algorithm producing means for analyzing data and a specification relating to said each monitoring object to produce a monitoring and diagnostic algorithm of the monitoring object;

software producing means for producing monitoring and diagnostic software based on the produced monitoring and diagnostic algorithm, the monitoring and diagnostic software being used to monitor and diagnose said each monitoring object;

transmission schedule producing means for producing a transmission schedule in transmitting the produced monitoring and diagnostic software to the monitoring processing system;

transmitting means for transmitting the monitoring and diagnostic software to said each monitoring processing system through the communication network according to the transmission schedule, the monitoring processing system requiring the monitoring and diagnostic software;

receiving means for receiving monitoring data and diagnostic result of said each monitoring object from said each monitoring processing system, the monitoring data and diagnostic result being of result executed by the monitoring and diagnostic software; and second algorithm producing means for accepting the monitoring data and diagnostic result received by the receiving means, confirming the execution result of the monitoring and diagnostic software executed by said each monitoring processing system, and correcting and changing the monitoring and diagnostic software, and said each monitoring processing system includes:

receiving means for receiving the monitoring and diagnostic software transmitted from the transmitting means;

software execution processing means for executing the received monitoring and diagnostic software; and transmitting means for transmitting monitoring data and diagnostic result of said each monitoring object to the center-side processing system through the communication network, the monitoring data and diagnostic result being of result executed by the software execution processing means.

In the remote monitoring and diagnostic system according to a second aspect of the invention, preferably the center-side processing system includes verification processing means for enabling appropriate monitoring and diagnostic software to be transmitted to each monitoring processing system by verifying the monitoring and diagnostic software produced by the software producing means an a simulation basis in the center-side processing system before the monitoring and diagnostic software is transmitted to each monitoring processing system or by verifying the monitoring and diagnostic software with a monitoring and diagnostic software verifying apparatus in which a local monitoring object real machine for testing connected to the communication network is used.

In the remote monitoring and diagnostic system according to a third aspect of the invention, preferably the center-side processing system includes update trigger generating means for generating an update trigger when receiving a monitoring and diagnostic software update request based on at least one of the following conditions, and means for producing an algorithm corresponding to the update trigger which, when the update trigger is received, takes the place of the first algorithm producing means for producing an algorithm for updating the software.

In the remote monitoring and diagnostic system according to a fourth aspect of the invention, preferably the center-side processing system includes load-related transmission schedule producing means instead of the transmission schedule producing means, the load-related transmission schedule producing means producing update timing of the monitoring and diagnostic software in consideration of a load status or a stop time of each monitoring object-side monitoring processing system to transmit the update timing to each monitoring object-side monitoring processing system through the transmitting means when the many monitoring processing systems are connected to the communication network. The each monitoring object-side monitoring processing system includes software update processing means for accepting the monitoring and diagnostic software through the receiving means, the monitoring and diagnostic software being transmitted from the center-side processing system through the communication network, and for updating the monitoring and diagnostic software of the software execution processing means based on the update timing of the monitoring and diagnostic software.

DETAILED DESCRIPTION OF THE INVENTION

Each embodiment of the invention will be described below with reference to the drawings.

First Embodiment

Figure 1:
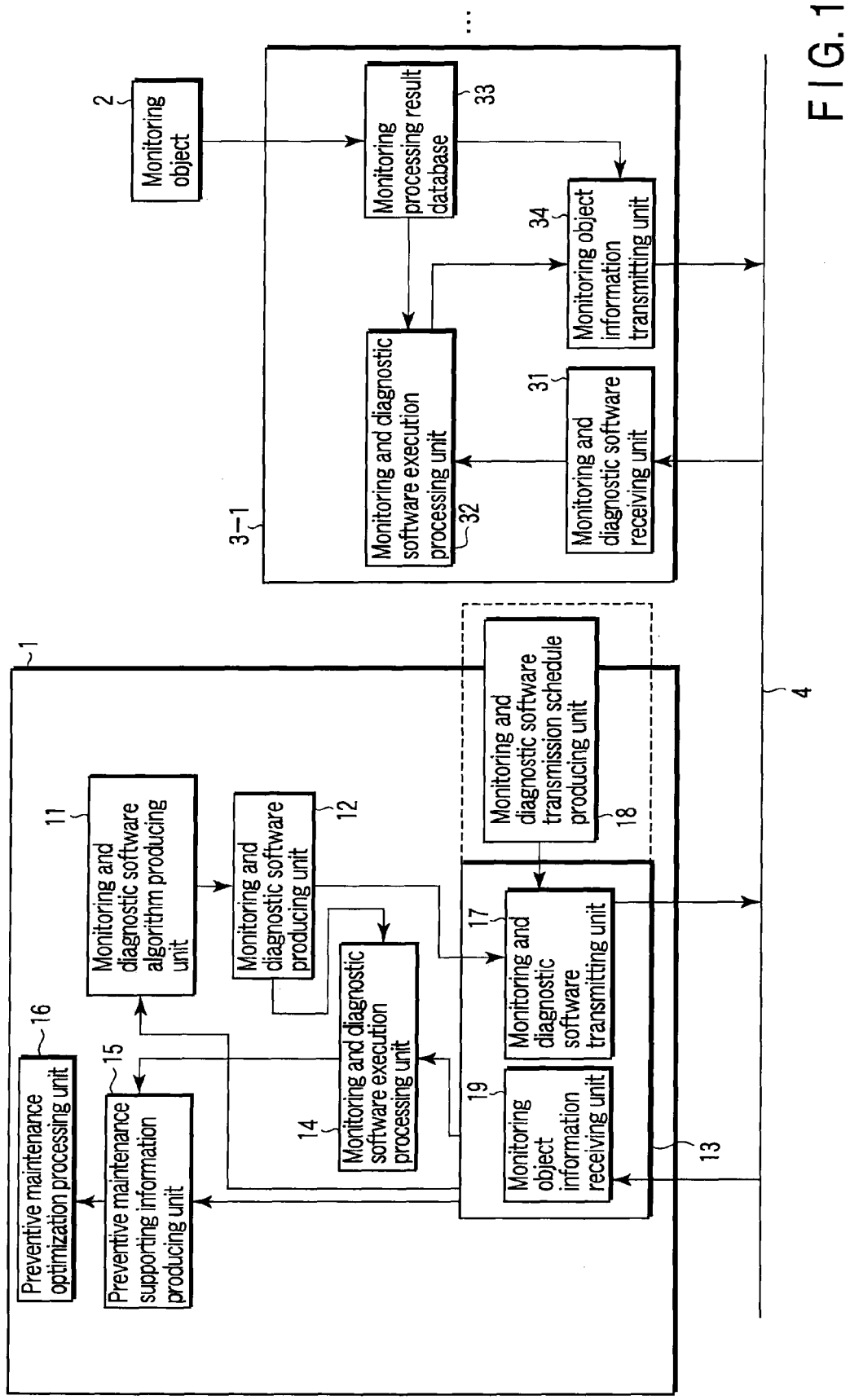
FIG. 1 is a block diagram showing a remote monitoring and diagnostic system according to a first embodiment of the invention.

FIG. 1 is a block diagram showing a remote monitoring and diagnostic system according to a first embodiment of the invention.

In the remote monitoring and diagnostic system, a center-side processing system 1 which acts as a center and monitoring object-side monitoring processing systems 3-1, ... which monitor and diagnose monitoring objects 2 respectively are connected through a communication network 4.

The center-side processing system 1 includes a monitoring and diagnostic software algorithm producing unit 11, a monitoring and diagnostic software producing unit 12, a platform 13 which constitute a base of delivery and receipt of software and data, a monitoring and diagnostic software execution processing unit 14, a preventive maintenance supporting information producing unit 15, and a preventive maintenance optimization processing unit 16.

The monitoring and diagnostic software algorithm producing unit 11 produces algorithms of source codes which define monitoring and diagnostic procedures according to a processing mode of each monitoring object or processing performance of each of the monitoring processing systems 3-1, .... Therefore, data and specifications relating to each monitoring object 2 are previously obtained, and a monitoring algorithm and a diagnostic algorithm (hereinafter abbreviated to monitoring and diagnostic algorithm) which monitor and diagnose each monitoring object 2 on the basis of the obtained data and specifications.

The processing mode depends on processing contents and a processing purpose in the monitoring object of each of the monitoring processing systems 3-1, .... The processing performance depends on abilities of the monitoring processing system such as a processing speed and a rotating speed of each of the monitoring processing system 3-1, . . . which monitor and diagnose the monitoring objects 2. Examples of the previously obtained data relating to each monitoring object 2 include a measurement value and an instruction value of each sensor placed in each monitoring object 2. For example, in the case where a motor is used as the monitoring object 2, the instruction value and the measurement value of the number of rotations which imparted to the motor can be cited as an example of the previously-obtained data. The data is transmitted from the monitoring object 2 through the communication network 4, and the data which is collected by a maintenance person going off to the actual place is uploaded or manually fed into the computing machine of the center-side processing system 1.

The platform 13 is provided in the center-side processing system 1 in order to surely take in the necessary data of the monitoring object 2.

Specifications of each part used in each monitoring object 2 can be cited as an example of the previously obtained specifications of each monitoring object. For example, in the case where the motor is used as the monitoring object 2, the specifications of the motor are the previously obtained specifications of each monitoring object.

With reference to the algorithm relating to the monitoring, the data to be monitored is analyzed, filtering processing is performed if needed, and the optimum monitoring algorithm is produced by selecting an optimum filter for the data of the monitoring object 2.

An example of the algorithm relating to the diagnosis includes an algorithm, in which a threshold is previously set for monitoring data (such as a sensor measurement value and an operation instruction value) indicating a state of the monitoring object 2 and a diagnostic result indicating a warning or an abnormal message when one or plural kinds of the pieces of monitoring data exceed the threshold. In the case where the plural kinds of the pieces of monitoring data are utilized, it is thought that an equation for determining the monitoring data is produced using each threshold. For example, the monitoring object is diagnosed as a light-level abnormality when the plural kinds of the pieces of monitoring data exceed one threshold, the monitoring object is diagnosed as an intermediate-level abnormality when the plural kinds of the pieces of monitoring data exceed two thresholds, and the monitoring object is diagnosed as a severe-level abnormality when the plural kinds of the pieces of monitoring data exceed at least three thresholds.

In the case where the monitoring object 2 is operated, an operating algorithm in which a necessary operating procedure is described is produced.

The algorithm producing method is such as to produce algorithm in the source file or flowchart format by a program grammar.

The monitoring and diagnostic software algorithm producing unit 11 takes in feedback data of the monitoring data or diagnostic result which is results of monitoring software and diagnostic software (hereinafter referred to as monitoring and diagnostic software) produced by the monitoring and diagnostic software producing unit 12, which will be described later. The result of the monitoring and diagnostic software is performed by each of the monitoring object-side monitoring processing systems 3-1, . . . . An algorithm producer appropriately corrects and changes the produced monitoring and diagnostic software algorithm while taking an interactive format, and the algorithm producer produces the algorithm for the monitoring and diagnostic software as the best solution for each monitoring object 2.

The monitoring and diagnostic software producing unit 12 produces the monitoring and diagnostic software which is operable in each of the monitoring object-side monitoring processing systems 3-1, . . . on the basis of the monitoring and diagnostic algorithm produced by the monitoring and diagnostic software algorithm producing unit 11.

The software is produced as a trigger for producing the monitoring and diagnostic software on the basis of the following pieces of timing.

(a) Timing at which the algorithm for the monitoring and diagnostic software is transmitted from the monitoring and diagnostic software algorithm producing unit 11.

(b) Timing at which the software producing trigger is received when the monitoring and diagnostic software producing unit 12 or the center-side processing system 1 includes a human interface (HMI).

When the monitoring and diagnostic software producing unit 12 receives the software producing trigger through the human interface, the monitoring and diagnostic software producing unit 12 provides an algorithm producing trigger to the monitoring and diagnostic software algorithm producing unit 11 to encourage the production of the necessary monitoring or diagnostic algorithm.

The monitoring and diagnostic software is produced by adding a sub-routine for referring to input data (such as a moving program), a sub-routine with which each of the monitoring processing systems 3-1, . . . supplies the diagnostic result and the like, and a sub-routine for conducting communication with other programs such as OS to pure program software for performing each monitoring and diagnostic algorithm.

Any output format of the monitoring and diagnostic software may be adopted as long as the output format can be performed in each of the monitoring processing systems 3-1, . . . of the monitoring object 2. For example, a directly-executable program file, a description language for producing a Web page, and a file produced based on Soap (Simple object access protocol) may be adopted.

Additionally, the monitoring and diagnostic software can be produced as an agent having autonomous determining and performing functions. The agent has the following features: (i) The agent is autonomously moved and operated. (ii) The agent can be cooperated with other agents. (iii) The agent can be operated while adapting to surrounding change. (iv) The agent can voluntarily perform work. That is, the agent has a function of performing required processing based on autonomous determination while understanding an intention of a user, and the agent is produced by utilizing JAVA (registered trademark), XML, or an agent communication language (ACL).

However, similarly to the case in which a software execution environment is required in utilizing the monitoring and diagnostic software, it is necessary to create an agent execution environment in utilizing the agent. In the case where the monitoring and diagnostic software is used as the agent, the agent can be produced while divided into individual pieces of software like a monitoring agent, a diagnostic agent, and an operating agent which operates the monitoring object 2 for the purpose of the monitoring.

The platform 13 has a function which constitutes the delivery and receipt base of the software data as described above. The platform 13 includes a monitoring and diagnostic software transmitting unit 17, a monitoring and diagnostic software transmission schedule producing unit 18, and a monitoring object information receiving unit 19.

The monitoring and diagnostic software transmitting unit 17 transmits the monitoring and diagnostic software to the necessary monitoring object-side monitoring processing systems 3-1, ... through the communication network 4. At this point, the monitoring and diagnostic software is transmitted by the monitoring and diagnostic software transmitting unit 17 while destination identification data is added to the software having processing contents necessary for the monitoring object-side monitoring processing systems 3-1, ... in the pieces of monitoring and diagnostic software produced by the monitoring and diagnostic software producing unit 12.

The Internet, an intranet, and a public telephone line are used as the communication network 4. In the case where the software and data are transmitted through the communication network 4, for example, the transmission is performed using a TCP/IP protocol or an SNMP protocol.

The monitoring and diagnostic software transmitting unit 17 transmits the monitoring and diagnostic software according to a transmission schedule produced by the monitoring and diagnostic software transmission schedule producing unit 18, when the monitoring and diagnostic software transmitting unit 17 transmits the monitoring and diagnostic software necessary for the monitoring object-side monitoring processing systems 3-1, ... .

With reference to an example of the transmission schedule, in the case where a huge number of monitoring objects 2, ... exist, the monitoring and diagnostic software transmission schedule producing unit 18 produces the transmission schedules at predetermined intervals, and the monitoring and diagnostic software transmission schedule producing unit 18 provides an instruction for performing the transmission according to the transmission schedule to the monitoring and diagnostic software transmitting unit 17 while confirming that the monitoring processing system, for example, the monitoring processing system 3-1 surely receives the transmission schedule. This enables the monitoring and diagnostic software transmitting unit 17 to eliminate an error during the transmission.

The required software from the monitoring and diagnostic software transmitting unit 17 to the monitoring processing system, for example, the monitoring processing system 3-1, and the monitoring data and diagnostic result (feedback data) of the monitoring object 2 which are the software execution result are sent back from the monitoring processing system, for example, the monitoring processing system 3-1. Then, the monitoring object data information receiving unit 19 receives the monitoring data and diagnostic result, and the monitoring object data information receiving unit 19 transmits the monitoring data and diagnostic result to the monitoring and diagnostic software execution processing unit 14 and the preventive maintenance supporting information producing unit 15.

The monitoring and diagnostic software execution processing unit 14 receives the monitoring and diagnostic software having processing contents to be processed by the center-side processing system 1 in the pieces of monitoring and diagnostic software produced by the monitoring and diagnostic software producing unit 12, and the monitoring and diagnostic software execution processing unit 14 further performs the monitoring and diagnosis to the monitoring data and diagnostic result.

Examples of the software executed in the center-side processing system 1 include software for supplementing the monitoring and diagnostic processing of one of the monitoring object-side monitoring processing systems 3-1, ... and software for making the diagnosis while considering pieces of data received from the plural monitoring object-side monitoring processing systems 3-1, ... .

The monitoring and diagnostic software execution processing unit 14 receives the pieces of data transmitted from the monitoring object-side monitoring processing systems 3-1, ... through the monitoring object information receiving unit 19 of the platform 13, and the monitoring and diagnostic software execution processing unit 14 performs the monitoring and diagnosis using the monitoring and diagnostic software dealt with by the center-side processing system 1.

The monitoring and diagnostic software execution processing unit 14 receives the diagnostic result or monitoring data. The diagnostic result or monitoring data is transmitted from each of the monitoring object-side monitoring processing systems 3-1, ... and obtained by the execution of the monitoring and diagnostic software. The monitoring and diagnostic software execution processing unit 14 supplements a lack of processing performance of each of the monitoring object-side monitoring processing systems 3-1, ... using a simulation model in which monitoring and diagnostic software having contents to be processed by the center-side processing system 1 is utilized, or the monitoring and diagnostic software execution processing unit 14 monitors and diagnoses the states of the monitoring object-side monitoring processing systems 3-1, ... cooperated with one another.

The monitoring and diagnostic software execution processing unit 14 compares the diagnostic result or monitoring data to the past diagnostic result or monitoring data having high similarity, which are already managed and stored, and the monitoring and diagnostic software execution processing unit 14 finds deterioration of a component of the monitoring object, decreased performance of the monitoring object, or the light-, intermediate-, or severe-level abnormality to transmit it to the preventive maintenance supporting information producing unit 15.

When information which becomes preventive maintenance support such as a component check, a component exchange prediction time, and the warning of the light-, intermediate-, or severe-level abnormality of the component is obtained, the preventive maintenance supporting information producing unit 15 produces preventive maintenance supporting information such as a rapid check appropriate to the level of abnormality and the exchange prediction time to transmit the preventive maintenance supporting information to the preventive maintenance optimization processing unit 16 on the basis of the diagnostic result and monitoring data of each of the monitoring object-side monitoring processing systems 3-1, ... , which are received from the monitoring object information receiving unit 19 of the platform 13, and the result and monitoring data obtained from the monitoring and diagnostic software execution processing unit 14.

The preventive maintenance optimization processing unit 16 produces a preventive maintenance plan in the interactive format through a man-machine interface on the basis of the preventive maintenance supporting information produced by the preventive maintenance supporting information producing unit 15. For example, the preventive maintenance optimization processing unit 16 performs coordination such that the preventive maintenance plan does not overlap a maintenance check point already written in a schedule table of each month, the preventive maintenance optimization processing unit 16 shortens a check period on the basis of the deterioration of the component or the decreased performance of the monitoring object, and the preventive maintenance optimization processing unit 16 provides a message for encouraging a user to exchange the components when determining the presence of a risk of generating a fatal abnormality is generated from past experiences and the like. The preventive maintenance optimization processing unit 16 makes an optimum check maintenance and component exchange plan at that time by means of check and the exchange prediction time.

Frequently the state of the monitoring object 2 is changed in continuing to perform the monitoring and diagnosis. Although the optimum check maintenance and component exchange is not possibly performed in an initial plan, a deterioration tendency becomes clear or the decreased performance emerges remarkably by performing the monitoring and diagnosis of the momentarily changing state. Therefore, the optimum check maintenance and component exchange plan can be produced.

Each of the monitoring object-side monitoring processing systems 3-1, . . . includes a monitoring and diagnostic software receiving unit 31, a monitoring and diagnostic software execution processing unit 32, a monitoring processing result database 33, and a monitoring object information transmitting unit 34.

Using a communication protocol identical to that dealt with by the monitoring and diagnostic software transmitting unit 17, the monitoring and diagnostic software receiving unit 31 receives the monitoring and diagnostic software transmitted from the monitoring and diagnostic software transmitting unit 17 through the communication network 4, and the monitoring and diagnostic software receiving unit 31 transmits the monitoring and diagnostic software to the monitoring and diagnostic software execution processing unit 32.

The monitoring and diagnostic software execution processing unit 32 executes the monitoring software received from the monitoring and diagnostic software receiving unit 31. The monitoring and diagnostic software execution processing unit 32 obtains the monitoring data of the monitoring object 2 to store the monitoring data in the monitoring processing result database 33, and the monitoring and diagnostic software execution processing unit 32 executes the diagnostic software to obtain the diagnostic result of the monitoring data of the monitoring object 2, which is stored in the database 33.

For the execution of the monitoring and diagnostic software, in the case where the monitoring and diagnostic software is an execution file such as an EXE (EXECUTE) file, the execution file is executed.

The monitoring and diagnostic software execution processing unit 32 executes the monitoring, diagnostic, and operating agents in an agent execution environment, in the case where the monitoring and diagnostic software is the agent. Each of the monitoring object-side monitoring processing systems 3-1, . . . executes the monitoring, diagnostic, and operating agents, for example, in the case where the monitoring and diagnostic software is produced by the agent. These agents have the following behaviors.

(Monitoring Agent)

The monitoring agent notifies the monitoring object information transmitting unit 34 of the data necessary for the center-side processing system 1 while monitoring the monitoring data of the monitoring object 2. The monitoring object information transmitting unit 34 reads the data from the monitoring processing result database 33 on the basis of the notification contents, and the monitoring object information transmitting unit 34 transmits the data to the center-side processing system 1 through the communication network 4.

(Diagnostic Agent)

The diagnostic agent diagnoses the state of the monitoring object 2. The diagnostic agent obtains the monitoring data of the monitoring object 2 from the monitoring processing result database 33 to diagnose the state of the monitoring object 2. In an example of the algorithm of the diagnostic agent, the threshold is previously set for monitoring data (such as the sensor measurement value and the operation instruction value) indicating the state of the monitoring object, and the diagnostic result indicating the warning or the abnormal message when one or plural kinds of the pieces of monitoring data exceed the threshold. In the case where the plural kinds of the pieces of monitoring data are utilized, it is thought that the equation for determining the monitoring data is produced using each threshold. For example, the monitoring object is diagnosed as the light-level abnormality when the plural kinds of the monitoring data exceed one threshold, the monitoring object is diagnosed as the intermediate-level abnormality when the plural kinds of the monitoring data exceed two thresholds, and the monitoring object is diagnosed as the severe-level abnormality when the plural kinds of the monitoring data exceed at least three thresholds.

(Operating Agent)

The operating agent provides an instruction for taking in an output of each sensor of the monitoring object 2 in predetermined periods, the operating agent autonomously performs test operation of the function of the monitoring object 2 for the purpose of the diagnosis or the improvement of the operation of the monitoring object, and the operating agent provides an instruction for changing a parameter or a threshold.

The monitoring processing result database 33 has a function of conducting communication with the monitoring object 2 on the control data and monitoring data on the basis of a command from the monitoring and diagnostic software execution processing unit 32. The monitoring processing result database 33 retains data of a predetermined period. The data retaining period is determined by the kind of obtained data, the performance of each of the monitoring object-side monitoring processing systems 3-1, . . . , and required specifications of the monitoring and diagnostic software.

The data communication between the monitoring processing result database 33 and the monitoring object 2 can be conducted by the transmission through RS232C connection, USB connection, or network connection.

(Operation of System)

An operation of the system having the above-described configuration will be described below.

Upon a trigger in which the monitoring and diagnostic software algorithm producing unit 11 transmits the monitoring and diagnostic algorithm, the monitoring and diagnostic software producing unit 12 produces the monitoring and diagnostic software on the basis of the monitoring and diagnostic algorithm, and the monitoring and diagnostic software producing unit 12 transmits the monitoring and diagnostic software to the monitoring and diagnostic software transmitting unit 17.

At this point, the monitoring and diagnostic software transmitting unit 17 transmits the monitoring and diagnostic software to the monitoring object-side monitoring processing system, for example, the monitoring object-side monitoring processing system 3-1 requiring the monitoring and diagnostic software according to the transmission schedule by a predetermined communication protocol.

The monitoring and diagnostic software execution processing unit 32 of the monitoring object-side monitoring processing system 3-1 executes the monitoring and diagnostic software received by the monitoring and diagnostic software receiving unit 31, and the monitoring and diagnostic software execution processing unit 32 obtains the monitoring data and diagnostic result to store the monitoring data and diagnostic result in the monitoring processing result database 33. The monitoring and diagnostic software execution processing unit 32 sends a monitoring data transmission notification to the monitoring object information transmitting unit 34 on the basis of the diagnostic result, a predetermined period, and a request of the center-side processing system 1. The monitoring object information transmitting unit 34 reads the diagnostic result and the necessary monitoring data from the monitoring processing result database 33 on the basis of the notification contents, and the monitoring object information transmitting unit 34 transmits the diagnostic result and the necessary monitoring data to the center-side processing system 1 through the communication network 4.

The monitoring and diagnostic software execution processing unit 14 of the center-side processing system 1 receives the current monitoring result and monitoring data of each of the monitoring object-side monitoring processing systems 3-1, . . . . The current monitoring result and monitoring data is once received by the monitoring object information receiving unit 19. Then, the monitoring and diagnostic software execution processing unit 14 executes the monitoring and diagnostic software necessary only for the center-side processing system 1. The monitoring and diagnostic software is provided from the monitoring and diagnostic software producing unit 12. The monitoring and diagnostic software execution processing unit 14 diagnoses the change in state of the monitoring object, the state of the component deterioration, and the abnormal level of the component to provide the diagnostic result to the preventive maintenance supporting information producing unit 15. Using the current monitoring result and monitoring data of each of the monitoring object-side monitoring processing systems 3-1, . . . and the data of the execution result of the monitoring and diagnostic software execution processing unit 14, the preventive maintenance supporting information producing unit 15 produces the preventive maintenance supporting information to transmits the preventive maintenance supporting information to the preventive maintenance optimization processing unit 16.

On the basis of the preventive maintenance supporting information, the preventive maintenance optimization processing unit 16 produces an optimum preventive maintenance plan at this time while taking the interactive format, and the preventive maintenance optimization processing unit 16 transmits the preventive maintenance plan to a maintenance center or a component delivery center.

In producing the algorithm or at an appropriate time if needed, the monitoring and diagnostic software algorithm producing unit 11 takes in the monitoring result and monitoring data of each of the monitoring object-side monitoring processing systems 3-1, . . . , received by the monitoring object information receiving unit 19, the monitoring and diagnostic software algorithm producing unit 11 confirms whether the produced monitoring and diagnostic software algorithm is acceptable or defective, and the monitoring and diagnostic software algorithm producing unit 11 produces the optimum monitoring and diagnostic software algorithm for the monitoring object 2 by appropriately performing the correction and change.

According to the first embodiment, the center-side processing system 1 produces the monitoring and diagnostic software according to the processing mode of the control object 2 of each of the monitoring object-side monitoring processing systems 3-1, . . . or the processing performance of each of the monitoring object-side monitoring processing systems 3-1, . . . , and the center-side processing system 1 transmits the monitoring and diagnostic software to each of the monitoring object-side monitoring processing systems 3-1, . . . . Therefore, even if the many monitoring objects are connected, the center-side processing system 1 can sufficiently deal with the monitoring object-side monitoring processing systems 3-1, . . . which individually monitor and diagnose the monitoring objects 2, and the monitoring and diagnostic software of each of the monitoring object-side monitoring processing systems 3-1, . . . can relatively easily be updated.

In transmitting the monitoring and diagnostic software from the center-side processing system 1, the confirmation whether or not the software transmission is successful is made based on the transmission schedule of the center-side processing system 1, which allows the monitoring and diagnostic software to be surely provided to the monitoring object-side monitoring processing system 3-1, . . . requiring the monitoring and diagnostic software.

When receiving the monitoring result and monitoring data of each of the monitoring object-side monitoring processing systems 3-1, . . . , the monitoring and diagnostic software execution processing unit 14 executes the monitoring and diagnostic software provided from the monitoring and diagnostic software producing unit 12 to diagnose the change in state of the monitoring object, the state of the component deterioration, and the abnormal level of the component, and the monitoring and diagnostic software execution processing unit 14 provides the diagnostic result to the preventive maintenance supporting information producing unit 15. Therefore, the appropriate preventive maintenance supporting information can be produced to make the optimum preventive maintenance plan.

Additionally, the monitoring and diagnostic software algorithm producing unit 11 can confirm whether the monitoring and diagnostic software algorithm is acceptable or defective in producing the algorithm or at an appropriate time by taking in the monitoring result and monitoring data of each of the monitoring object-side monitoring processing systems 3-1, . . . , which are received by the monitoring object information receiving unit 19. Therefore, the optimum monitoring and diagnostic software algorithm for the monitoring object 2 can be produced.

In the case where plural monitoring objects 2, . . . perform substantially the same monitoring and diagnosis, the center-side processing system 1 produces the monitoring and diagnostic software having the same processing contents and the center-side processing system 1 concurrently transmits the monitoring and diagnostic software to the plural monitoring objects 2, . . . . The same holds true for the following embodiments.

Second Embodiment

Figure 2:
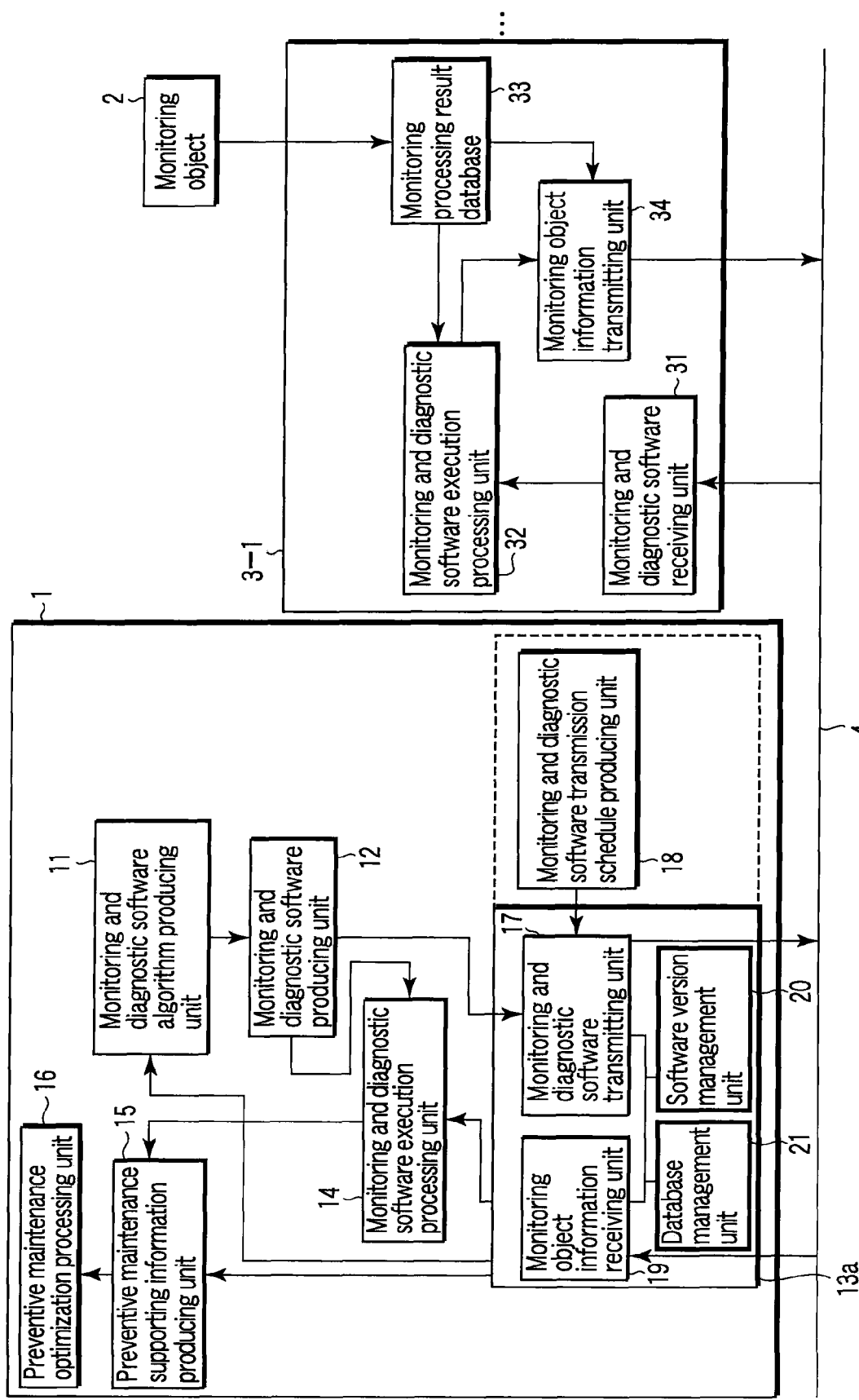
FIG. 2 is a block diagram showing a remote monitoring and diagnostic system according to a second embodiment of the invention.

FIG. 2 is a block diagram showing a remote monitoring and diagnostic system according to a second embodiment of the invention.

The remote monitoring and diagnostic system of the second embodiment is similar to the remote monitoring and diagnostic system of the first embodiment in that the center-side processing system 1, which acts as the center, and the monitoring object-side monitoring processing systems 3-1, . . . , which monitor and diagnose the monitoring objects 2, are respectively connected through the communication network 4.

The remote monitoring and diagnostic system of the second embodiment differs particularly from the remote monitoring and diagnostic system of the first embodiment in a platform 13*a* of the center-side processing system 1. Accordingly, because other configurations except for the platform 13*a* are similar to those of the first embodiment, the description is omitted.

As described above, a software version management unit 20 and a database management unit 21 are provided in the platform 13*a* in addition to the monitoring and diagnostic software transmitting unit 17, the monitoring and diagnostic software transmission schedule producing unit 18, and the monitoring object information receiving unit 19.

In transmitting the monitoring and diagnostic software from the monitoring and diagnostic software transmitting unit 17, the software version management unit 20 manages the transmitted software. In an example of the management, a new software name which is different from the already transmitted software, a version associated with software revision contents, and a number (such as ID) for identifying a monitoring object device of the other party which is a destination are formed into a set, and the management is performed such that each monitoring object 2 and the version of the transmitted monitoring and diagnostic software can be recognized. This enables the version of the monitoring and diagnostic software of each monitoring object 2 to be managed. Therefore, the mutual communication with each of the monitoring object-side monitoring processing systems 3-1, . . . is conducted to confirm the software version, so that the confirmation whether or not the software transmission is successful can be made.

The database management unit 21 has a roll in retaining information on the diagnostic result and monitoring data of each of the monitoring object-side monitoring processing systems 3-1, . . . , which is received by the monitoring object information receiving unit 19, and the like for a predetermined period. The retaining period is determined by performance of a computing machine of the center-side processing system 1, the number of monitoring objects 2, the number of monitoring items and the number of diagnostic items.

(Operation of System)

An operation of the system of the second embodiment will be described below.

Upon a trigger in which the monitoring and diagnostic software algorithm producing unit 11 transmits the monitoring and diagnostic algorithm, the monitoring and diagnostic software producing unit 12 produces the monitoring and diagnostic software on the basis of the monitoring and diagnostic algorithm, and the monitoring and diagnostic software producing unit 12 transmits the monitoring and diagnostic software to the monitoring and diagnostic software transmitting unit 17.

At this point, in transmitting the monitoring and diagnostic software, the monitoring and diagnostic software transmitting unit 17 stores the set of the new software name which is different from the already transmitted software, the version associated with software revision contents, and the number (such as ID) for identifying the monitoring object device of the other party which is the destination in the software version management unit 20. After that, the monitoring and diagnostic software transmitting unit 17 transmits the monitoring and diagnostic software to the monitoring object-side monitoring processing system which requires the monitoring and diagnostic software in a predetermined protocol, such as the monitoring object-side monitoring processing system 3-1, according to the transmission schedule.

The monitoring and diagnostic software execution processing unit 32 of the monitoring object-side monitoring processing system, for example, the monitoring object-side monitoring processing system 3-1 executes the monitoring and diagnostic software received by the monitoring and diagnostic software receiving unit 31, and the monitoring and diagnostic software execution processing unit 32 obtains the monitoring data and diagnostic result to store the monitoring data and diagnostic result in the monitoring processing result database 33. The monitoring and diagnostic software execution processing unit 32 sends a monitoring data transmission notification to the monitoring object information transmitting unit 34 on the basis of the diagnostic result, a predetermined period, and a request of the center-side processing system 1.

The monitoring object information transmitting unit 34 reads the diagnostic result and the necessary monitoring data from the monitoring processing result database 33 on the basis of the notification contents, and the monitoring object information transmitting unit 34 transmits the diagnostic result and the necessary monitoring data to the center-side processing system 1 through the communication network 4.

When the monitoring object information receiving unit 19 of the center-side processing system 1 receives the diagnostic result and necessary monitoring data transmitted from each of the monitoring object-side monitoring processing systems 3-1, . . . , the monitoring object information receiving unit 19 retains the diagnostic result and necessary monitoring data in the database management unit 21 for a predetermined period. When a request for providing the diagnostic result and necessary monitoring data is received from a unit of the center-side processing system 1 if needed, the monitoring object information receiving unit 19 reads the diagnostic result and necessary monitoring data from the database management unit 21 to provide the diagnostic result and necessary monitoring data to the unit which makes the request.

The monitoring and diagnostic software algorithm producing unit 11 takes in the diagnostic result or the monitoring data which is the feedback data from each of the monitoring object-side monitoring processing systems 3-1, . . . , and the monitoring and diagnostic software algorithm producing unit 11 can produce the optimum monitoring and diagnostic software for the monitoring and diagnosis of the monitoring object 2 while correcting and changing the monitoring and diagnostic software.

Accordingly, in the second embodiment, in addition to the effects similar to those of the first embodiment, the center-side processing system 1 performs the version management of the monitoring and diagnostic software, which allows the monitoring and diagnostic software to be surely transmitted to the destination with no false transmission of the monitoring and diagnostic software.

The monitoring object information receiving unit 19 of the center-side processing system 1 retains the diagnostic result and necessary monitoring data transmitted from each of the monitoring object-side monitoring processing systems 3-1, . . . in the database management unit 21 for a predetermined period, and the monitoring object information receiving unit 19 provides the diagnostic result and necessary monitoring data to the unit which makes the request, when necessary. Therefore, the monitoring and diagnostic software execution processing unit 14 can diagnose a transition of the change of the monitoring object 2 or the state of progress of the deterioration while comparing the data relating to the same monitoring object 2 to the current data received from each of the monitoring object-side monitoring processing systems 3-1, . . . , and the monitoring and diagnostic software execution processing unit 14 can diagnose an appropriate level during the abnormality to provide the diagnostic result having higher accuracy to the preventive maintenance supporting information producing unit 15.

Third Embodiment

Figure 3:
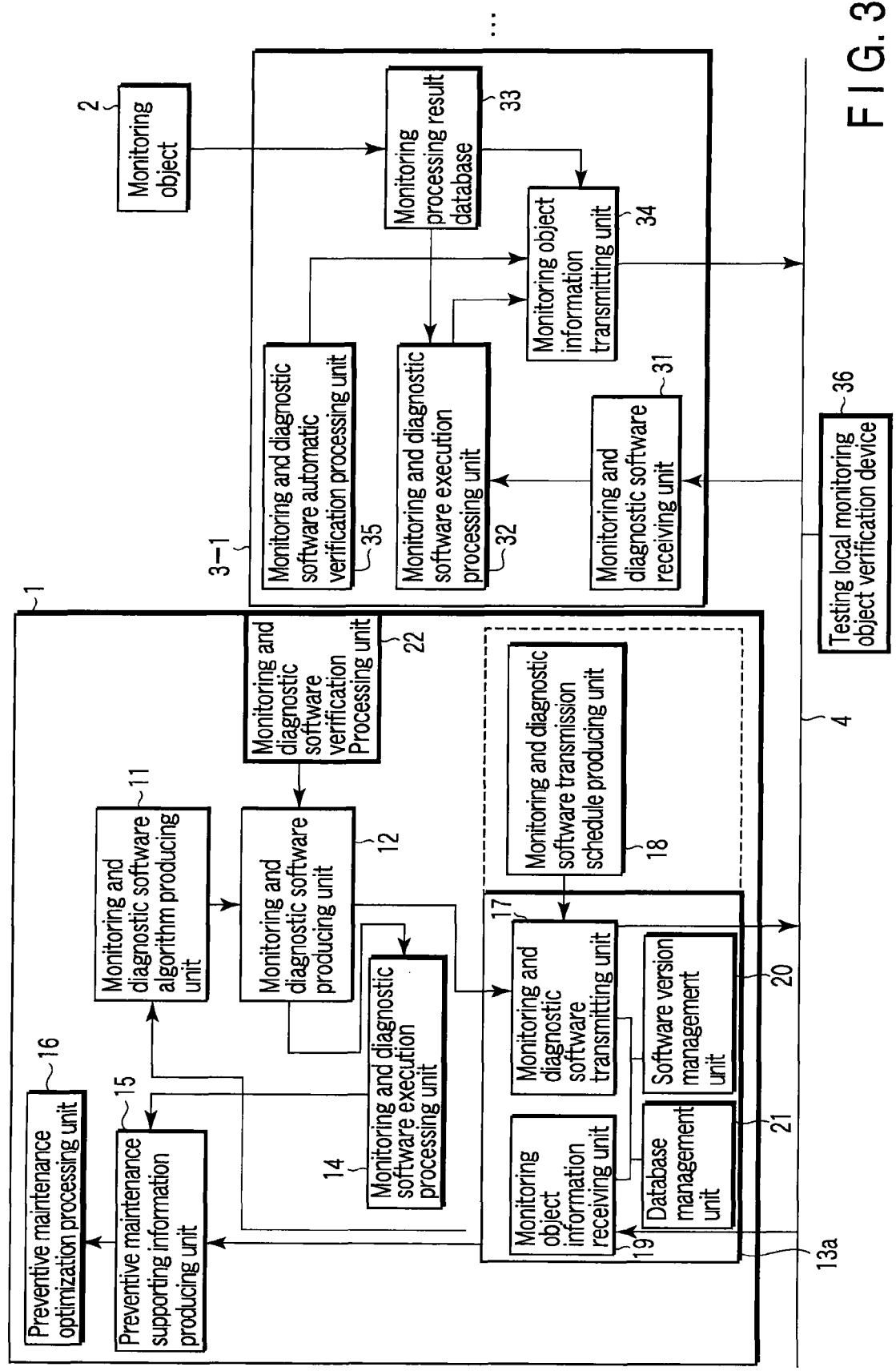
FIG. 3 is a block diagram showing a remote monitoring and diagnostic system according to a third embodiment of the invention.

FIG. 3 is a block diagram showing a remote monitoring and diagnostic system according to a third embodiment of the invention.

In the remote monitoring and diagnostic system of the third embodiment, the center-side processing system 1 which acts as the center and the monitoring object-side monitoring processing systems 3-1, . . . which monitor and diagnose the monitoring objects 2 are respectively connected through the communication network 4.

The center-side processing system 1 has a configuration in which a monitoring and diagnostic software verification processing unit 22 is newly added to the monitoring and diagnostic software producing unit 12 in addition to all the components 11 to 21 shown in FIG. 2. Accordingly, because the components 11 to 21 of the center-side processing system 1 shown in FIG. 3 are similar to those of the first and second embodiments, the description is omitted.

On the other hand, in each of the monitoring object-side monitoring processing system 3-1, . . . , a monitoring and diagnostic software automatic verification processing unit 35 is newly provided in addition to all the components 31 to 34 shown in FIGS. 1 and 2. Accordingly, because the components 31 to 34 shown in FIG. 3 are similar to those of the first and second embodiments, the description is omitted.

The monitoring and diagnostic software verification processing unit 22 performs processing for verifying the monitoring and diagnostic software produced by the monitoring and diagnostic software producing unit 12. That is, in the verification processing, a previously installed simulation model is installed in the monitoring and diagnostic software verification processing unit 22, the monitoring and diagnostic software verification processing unit 22 receives the monitoring and diagnostic software from the monitoring and diagnostic software producing unit 12, and the monitoring and diagnostic software verification processing unit 22 virtually applies the monitoring and diagnostic software to evaluate the execution result of the monitoring and diagnostic software. In the verification, a previously assumed case and a previously assumed execution result are prepared, and the evaluation is obtained by comparing the previously assumed execution result to the execution result of the produced monitoring and diagnostic software.

At this point, a hardware model equivalent to the monitoring object 2, a size reduced model of the monitoring object 2, or software simulation software can be used as the simulation model.

Alternatively, the monitoring and diagnostic software verification processing unit 22 can virtually execute the monitoring and diagnostic software to perform the verification using output data obtained from each of the monitoring object-side monitoring processing systems 3-1, . . . through the communication network 4 or a prototype testing local monitoring object real machine 36 which constitutes a group of simulation models previously connected to the network.

In the monitoring and diagnostic software verification processing unit 22, the monitoring and diagnostic software for which the verification is already finished is transmitted from the monitoring and diagnostic software producing unit 12 to each of the monitoring object-side monitoring processing systems 3-1, . . . through the monitoring and diagnostic software transmitting unit 17, and the monitoring and diagnostic software is executed to the monitoring object 2.

On the other hand, the monitoring and diagnostic software automatic verification processing unit 35 of each of the monitoring object-side monitoring processing systems 3-1, . . . automatically verifies whether or not the monitoring and diagnostic software is normally operated from the state of the monitoring and diagnostic software executed by the monitoring and diagnostic software execution processing unit 32.

In an example of the automatic verification, the monitoring and diagnostic software automatic verification processing unit 35 virtually transmits a test signal to the monitoring and diagnostic software execution processing unit 32 to confirm the processing state of the monitoring and diagnostic software, or a program size of the monitoring and diagnostic software is monitored to automatically verify whether or not the unexpected malfunction, the software falsification, and the processing result different from the normal processing are obtained.

When the monitoring and diagnostic software automatic verification processing unit 35 determines that the monitoring and diagnostic software is abnormal, the monitoring and diagnostic software automatic verification processing unit 35 stops the monitoring and diagnostic software, and the monitoring and diagnostic software automatic verification processing unit 35 performs processing such as rollback of the monitoring and diagnostic software such that the monitoring and diagnostic software is normally executed. The verification result performed by the monitoring and diagnostic software automatic verification processing unit 35 is transmitted to the monitoring object information transmitting unit 34 and stored in the database management unit 21 through the monitoring object information receiving unit 19 of the center-side processing system 1. The verification result can be recognized by reading the verification result if needed.

Accordingly, in the third embodiment, in addition to the effects similar to those of the first and second embodiments, the monitoring and diagnostic software verification processing unit 22 verifies the monitoring and diagnostic software produced by the monitoring and diagnostic software producing unit 12 using the simulation model, or the monitoring and diagnostic software verification device 36 which is the local monitoring object real machine on the network 4 automatically verifies whether or not the monitoring and diagnostic software is normally operated. Therefore, the monitoring and diagnostic software having quality in which a moderate evaluation is obtained can be provided to each of the monitoring object-side monitoring processing system 3-1, . . . .

The monitoring and diagnostic software automatic verification processing unit 35 provided on each of the monitoring object-side monitoring processing systems 3-1, . . . transmits the test signal to the monitoring and diagnostic software execution processing unit 32, the monitoring and diagnostic software automatic verification processing unit 35 monitors the results of the monitoring and diagnostic software executed by the monitoring and diagnostic software execution processing unit 32, and the monitoring and diagnostic software automatic verification processing unit 35 can encourage the execution of the normal monitoring and diagnostic software during the abnormality.

(Hardware Configuration)

Figure 4:
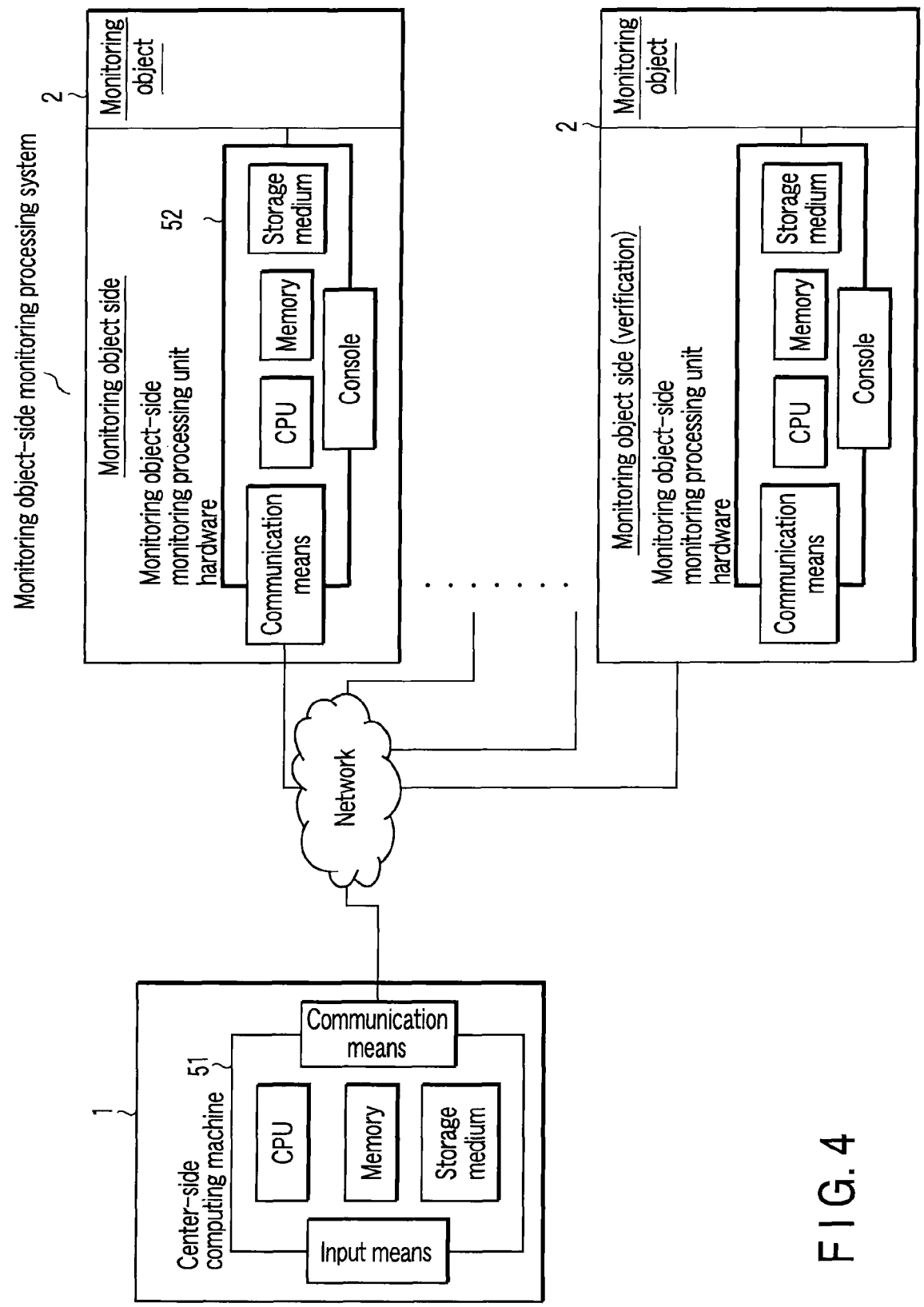
FIG. 4 is a view showing an example of a hardware configuration for realizing the remote monitoring and diagnostic system of each embodiment.

FIG. 4 is a view showing an example of a hardware configuration for realizing the remote monitoring and diagnostic system of each of the above-described embodiments.

A center-side computing machine 51 is placed in the center-side processing system 1. Input means, a storage medium, CPU, a memory, and communication means are provided in the center-side computing machine 51. The input means is used to feed pieces of data for producing various algorithm and pieces of software and a necessary control instruction. A processing flow for performing predetermined processing is stored in the storage medium. CPU realizes a predetermined function according to the predetermined processing flow stored in the storage medium. Examples of the function unit realized by CPU include the monitoring and diagnostic software algorithm producing unit 11, the monitoring and diagnostic software producing unit 12, the monitoring and diagnostic software execution processing unit 13, the preventive maintenance supporting information producing unit 16, the preventive maintenance optimization processing unit 16, and the monitoring and diagnostic software verification processing unit 22. The memory acts as the database constituting the software version management unit 20 and database management unit 21. The units 17 to 19 included in the platforms 13 and 13*a* or the like are provided in communication means.

In addition to various monitoring processing computing machines 52 which depend on the monitoring objects 2, a monitoring processing computing machine 52*a* having a monitoring and diagnostic software verification function is placed in each of the monitoring object-side monitoring processing system 3-1, . . . . For example, a server-level computing machine, a note PC-level computing machine, or a board computer-level computing machine is used as the monitoring processing computing machines 52 and 52*a*.

Each of the monitoring processing computing machines 52 and 52*a* includes communication means, CPU, a memory in which data such as the software execution result is stored, a storage medium in which the monitoring and diagnostic software is stored, and a console having a man-machine interface function. The monitoring and diagnostic software receiving unit 31 and the monitoring object information transmitting unit 34 are provided in the communication means. CPU functionally realizes the monitoring and diagnostic software execution processing unit 32 and the monitoring and diagnostic software automatic verification processing unit 35. The monitoring processing result database 33 is provided in the memory.

Obviously the hardware configuration shown in FIG. 4 is also applied to the following embodiments.

Fourth Embodiment

Figure 5:
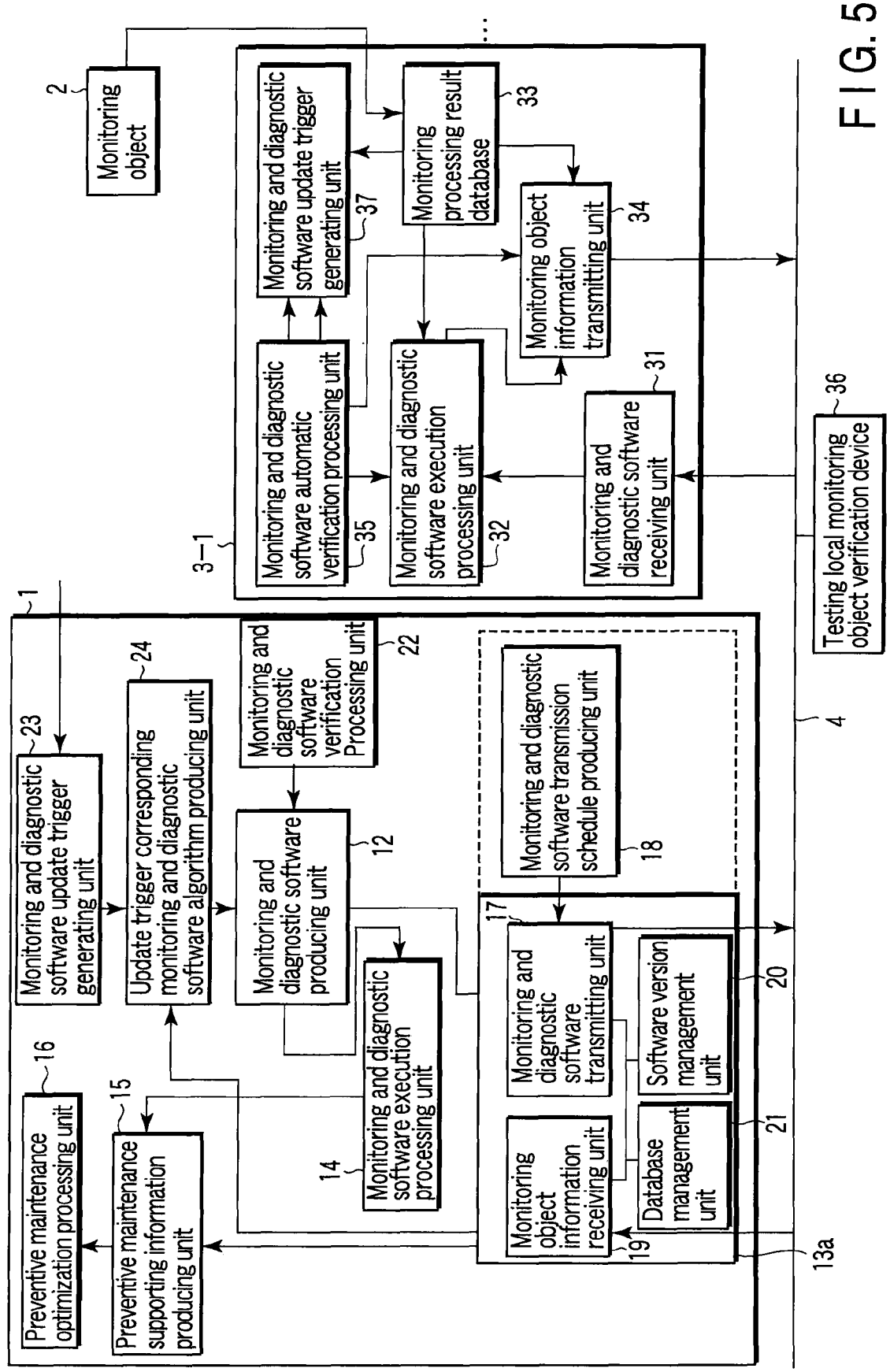
FIG. 5 is a block diagram showing a remote monitoring and diagnostic system according to a fourth embodiment of the invention.

FIG. 5 is a block diagram showing a remote monitoring and diagnostic system according to a fourth embodiment of the invention.

In the remote monitoring and diagnostic system of the fourth embodiment, the center-side processing system 1 and each of the monitoring object-side monitoring processing systems 3-1, . . . are connected through the communication network 4.

In the center-side processing system 1, a monitoring and diagnostic software update trigger generating unit 23 and an update trigger corresponding monitoring and diagnostic software algorithm producing unit 24 corresponding to the monitoring and diagnostic software algorithm producing unit 11 are newly provided in addition to the similar components 11 to 22 of FIGS. 1 to 3. Therefore, because the components 11 to 22 shown in FIG. 5 are similar to those of the first to third embodiments, the description is omitted.

In each of the monitoring object-side monitoring processing systems 3-1, . . . , a monitoring and diagnostic software update trigger generating unit 37 is newly provided in addition to the components 31 to 35 similar to those of FIGS. 1 to 3. Therefore, because the components 31 to 35 shown in FIG. 5 are similar to those of the first to third embodiments, the description is omitted.

The monitoring and diagnostic software update trigger generating unit 23 of the center-side processing system 1 has a function of generating an update trigger of the monitoring and diagnostic software when the update of the monitoring and diagnostic software is determined to be required on the basis of a man-caused determination or an update request from the monitoring object.

The following cases can be cited as an example of the case in which the update of the monitoring and diagnostic software is required.

(A1) The case in which a new diagnostic method is developed.

(A2) The case in which the determination that the update is required is made from a maintenance track record of the monitoring object 2.

(A3) The case in which the number of monitoring items or diagnostic items is increased or decreased.

When the cases A1 to A3 are generated, an operator feeds an operation instruction through the man-machine interface, and the monitoring and diagnostic software update trigger generating unit 23 generates the update trigger of the monitoring and diagnostic software.

When receiving the update trigger of the monitoring and diagnostic software from the monitoring and diagnostic software update trigger generating unit 23, the update trigger corresponding monitoring and diagnostic software algorithm producing unit 24 produces the monitoring and diagnostic software algorithm of, for example, the monitoring object-side monitoring processing system 3-1 corresponding to the monitoring object 2, and the update trigger corresponding monitoring and diagnostic software algorithm producing unit 24 transmits the monitoring and diagnostic software algorithm to the monitoring and diagnostic software producing unit 12.

On the other hand, the monitoring and diagnostic software update trigger generating unit 37 of each of the monitoring object-side monitoring processing systems 3-1, . . . generates a trigger signal for updating the software, when the determination that software update is required is made under a situation where the monitoring and diagnostic software is actually executed. In the case where the software update is required, the need of the monitoring and diagnostic software update is evaluated based on the monitoring object-side verification result produced by the monitoring and diagnostic software automatic verification processing unit 35, the monitoring object-side diagnostic result produced by the monitoring and diagnostic software execution processing unit 32, or the monitoring data of the monitoring object 2 which is obtained from the monitoring processing result database 33.

The following cases can be raised as a specific example of the case in which the update of the monitoring object-side monitoring and diagnostic software is required.

(B1) The case in which the determination that the update is required is made from the diagnostic result of the monitoring object 2 by performing the monitoring and diagnostic software.

(B2) The case in which the determination that the software update is required is made from the monitoring data for a predetermined period due to the secular change of the monitoring object.

(B3) The case in which the determination that the update is required is made from the automatic verification result of the monitoring and diagnostic software.

Accordingly, in the fourth embodiment, when the update trigger signal is generated from the monitoring and diagnostic software update trigger generating unit 37 or monitoring and diagnostic software update trigger generating unit 23 on the basis of the above-described cases, the update trigger signal is directly transmitted to the update trigger corresponding monitoring and diagnostic software algorithm producing unit 24, or the update trigger signal is transmitted to the update trigger corresponding monitoring and diagnostic software algorithm producing unit 24 through the communication network 4.

When receiving the update trigger of the monitoring and diagnostic software, the update trigger corresponding monitoring and diagnostic software algorithm producing unit 24 produces the monitoring and diagnostic algorithm corresponding to the monitoring and diagnostic software algorithm producing unit 11.

In an example in which the algorithm is produced, various algorithms are produced as follows according to the above-described update cases.

(A1) The case in which the new diagnostic method is developed.

In the case where the new diagnostic method is developed by technical improvement of a statistical technique, a data mining technique, or the like, the software is updated in order to apply the diagnostic method in which the technique is used. Therefore, diagnostic performance can further be improved.

(A2) The case in which the determination that the update is required is made from the maintenance track record of the monitoring object 2.

The software is adjusted or updated when the determination that the diagnostic result of the monitoring and diagnostic software corresponds insufficiently to the actual maintenance is made from the periodic maintenance track record. An example of the case in which the determination that the update is required is made from the maintenance track record includes the case in which actual breakdown is increased while a probability of the breakdown is exhibited lower in the diagnostic result of the monitoring and diagnostic software. Additionally, when the good diagnostic performance or good adjustment is not obtained, or when the diagnostic performance or the adjustment does not suit the present condition, the monitoring and diagnostic software is updated based on the new monitoring data in order to re-adjust adjusting elements such as a parameter of the monitoring and diagnostic software.

(A3) The case in which the number of monitoring items or diagnostic items is increased or decreased.

When the number of items to be diagnosed is increased by the addition of new maintenance service, or when the number of monitoring items is increased by placing a new sensor in the monitoring object 2, the software is updated in order to correspond to the increased items. In the design specifications of the monitoring object 2, when a new design specification is utilized, the software is updated in order to correspond to the specification. When the number of monitoring items is increased, because the diagnostic algorithm which cannot be used in the past can be adopted, the update to the new diagnostic algorithm is required in this case. In the case where the agent is used, the diagnostic agent dedicated to the newly increased diagnostic item is produced and added in the format in which the diagnostic agent dedicated to each diagnostic item is produced.

At this point, the monitoring and diagnostic software is updated in the above-described cases.

(B1) The case in which the determination that the update is required is made from the diagnostic result of the monitoring object 2 by performing the monitoring and diagnostic software.

For example, like the case in which an alarm is frequently generated due to the loose setting of the diagnostic threshold, in the case where the determination that the adjustment of the monitoring and diagnostic software is required is made from the diagnostic result of the monitoring and diagnostic software for the monitoring object 2, the software is updated. When the diagnostic performance or adjustment of the monitoring and diagnostic software currently used is deteriorated, or when the monitoring and diagnostic software does not suit the current monitoring object 2, the monitoring and diagnostic software is updated in order to re-adjust adjusting elements such as a parameter of the monitoring and diagnostic software using the new monitoring data.

(B2) The case in which the determination that the software update is required is made from the monitoring data for a predetermined period due to the secular change of the monitoring object.

In utilizing the sensor measurement value to obtain the monitoring data or the diagnostic result, when new preprocessing or advanced preprocessing that is different from the current preprocessing is required according to the secular change or the environmental change, it is necessary to update the software. For example, a filtering function (for example, moving average is the simplest filtering function) is included in the monitoring and diagnostic software at the beginning of the system installation when a time-series measurement value including a noise are taken in the monitoring item of the monitoring object 2. Usually the time-series measurement value including the noise can directly be used when a tendency of the noise is not changed.

However, when the tendency of the noise is largely changed by the secular change or new generation of a noise generation factor (such as a power supply), sometimes an influence of the noise cannot be removed by the initially-adopted filter.

Therefore, the software is updated in order to achieve upgrading (for example, adjustment of a filter coefficient and replacement of the adaptive filter by the upgrading filter) of the filter at an appropriate time.

When the noise is increased by an external factor to deteriorate the performance of the monitoring and diagnostic software, the monitoring and diagnostic software is updated in order to improve the performance of the monitoring and diagnostic software.

(B3) The case in which the determination that the update is required is made from the automatic verification result of the monitoring and diagnostic software.

When the result that the monitoring and diagnostic software is abnormal is obtained in the verification result of the monitoring and diagnostic software automatic verification processing unit 35, the monitoring and diagnostic software having the same version is transmitted. When a bug exists as an analytical result, the monitoring and diagnostic software is updated to (replaced by) the monitoring and diagnostic software having the version in which the bug is removed.

Accordingly, in the fourth embodiment, in addition to the effects similar to those of the first to third embodiments, the monitoring and diagnostic update trigger generating functions are provided in the center-side processing system 1 and each of the monitoring object-side monitoring processing systems 3-1, ... to accept the monitoring and diagnostic update trigger generated under the predetermined conditions, so that the monitoring and diagnostic software can relatively easily be updated. Therefore, the remote monitoring and diagnostic system can quickly correspond to the upgrading of the monitoring and diagnostic performance of the monitoring object, and the monitoring and diagnostic software can be updated in order to perform the monitoring and diagnosis having a moderate-level quality according to the secular change or environmental change of the monitoring object.

Fifth Embodiment

Figure 6:
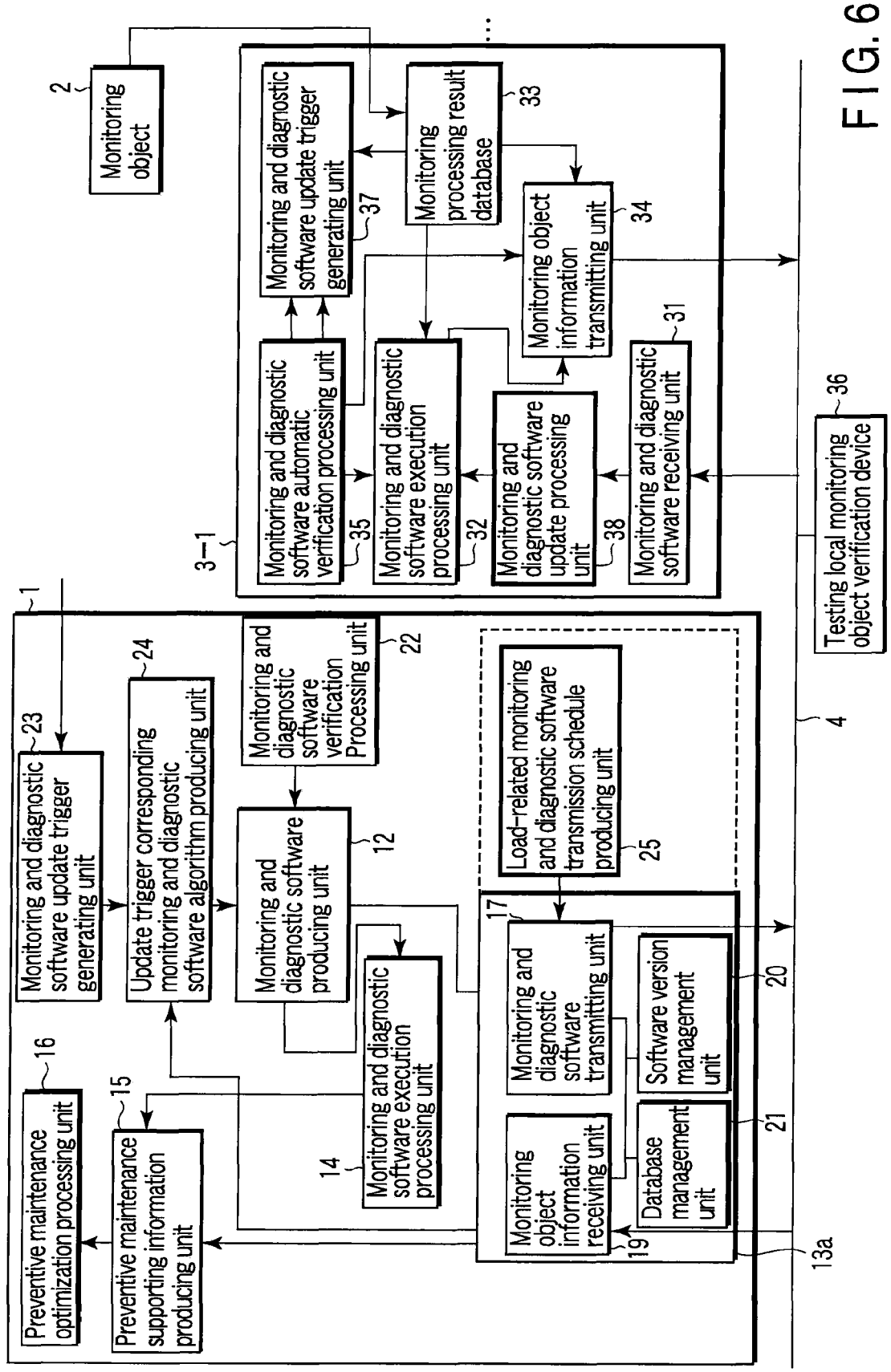
FIG. 6 is a block diagram showing a remote monitoring and diagnostic system according to a fifth embodiment of the invention.

FIG. 6 is a block diagram showing a remote monitoring and diagnostic system according to a fifth embodiment of the invention.

In the remote monitoring and diagnostic system of the fifth embodiment, the center-side processing system 1 and each of the monitoring object-side monitoring processing systems 3-1, . . . are connected through the communication network 4.

The center-side processing system 1 has a configuration in which a load-related monitoring and diagnostic software transmission schedule producing unit 25 is newly provided instead of the monitoring and diagnostic software transmission schedule producing unit 18 of the platform 13a. Therefore, in the center-side processing system 1, other configurations except for the load-related monitoring and diagnostic software transmission schedule producing unit 25 are similar to those of FIGS. 1 to 3 and 5, the description is omitted.

On the other hand, in each of the monitoring object-side monitoring processing systems 3-1, . . . , a monitoring and diagnostic software update processing unit 38 is newly provided between the monitoring and diagnostic software receiving unit 31 and the monitoring and diagnostic software execution processing unit 32. Because other configurations are similar to those of FIGS. 1 to 3 and 5, the description is omitted.

In the load-related monitoring and diagnostic software transmission schedule producing unit 25, performance is further increased compared with the function corresponding to the monitoring and diagnostic software transmission schedule producing unit 18. Because many monitoring object-side monitoring processing systems 3-1, . . . are connected through the communication network 4, an update timing signal of the monitoring and diagnostic software of each of the monitoring object-side monitoring processing systems 3-1, . . . is produced in comprehensive consideration of the many monitoring object-side monitoring processing systems 3-1, . . . .

In an example in which the update timing is produced, the optimum update timing is produced using optimizing software in which a load status or a stop time is used as an evaluation function. The load status or the stop time is of an operating status of each monitoring object 2.

The monitoring and diagnostic software update timing signal which is produced by the load-related monitoring and diagnostic software transmission schedule producing unit 25 for each of the monitoring object-side monitoring processing systems 3-1, . . . is transmitted to, for example, the corresponding monitoring object-side monitoring processing system 3-1 through the communication network 4.

The load-related monitoring and diagnostic software transmission schedule producing unit 25 has not only the function of producing the update timing signal but also the function of determining timing at which the diagnostic result and monitoring data received from each of the monitoring object-side monitoring processing systems 3-1, . . . are transmitted from the platform 13a to, for example, the components 14, 15, and 24 in the center-side processing system 1 according to a computation load status of the center-side computing machine 51 of FIG. 4 in the center-side processing system 1. Accordingly, the platform 13a transmits the diagnostic result and monitoring data to, for example, the components 14, 15, and 24 in the center-side processing system 1 on the basis of the determined transmission timing.

The monitoring and diagnostic software update processing unit 38 of each of the monitoring object-side monitoring processing systems 3-1, . . . receives the monitoring and diagnostic software update timing signal, and the monitoring and diagnostic software update processing unit 38 updates the monitoring and diagnostic software according to the update timing. The monitoring and diagnostic software update timing signal is produced by the load-related monitoring and diagnostic software transmission schedule producing unit 25 and transmitted through the communication network 4.

According to the fifth embodiment, even if the system has the many monitoring objects 2, . . . , the optimum monitoring and diagnostic software update timing can be used in consideration of the many monitoring objects 2, . . . . Because the center-side processing system 1 produces the update timing, the optimum update timing can be produced as the whole of the system.

Additionally, the computing machine resource can effectively be utilized because the necessary diagnostic result and monitoring data are transmitted to the necessary component in the center-side processing system 1 in consideration of load status in the platform 3a of the center-side processing system 1.

Sixth Embodiment

Figure 7:
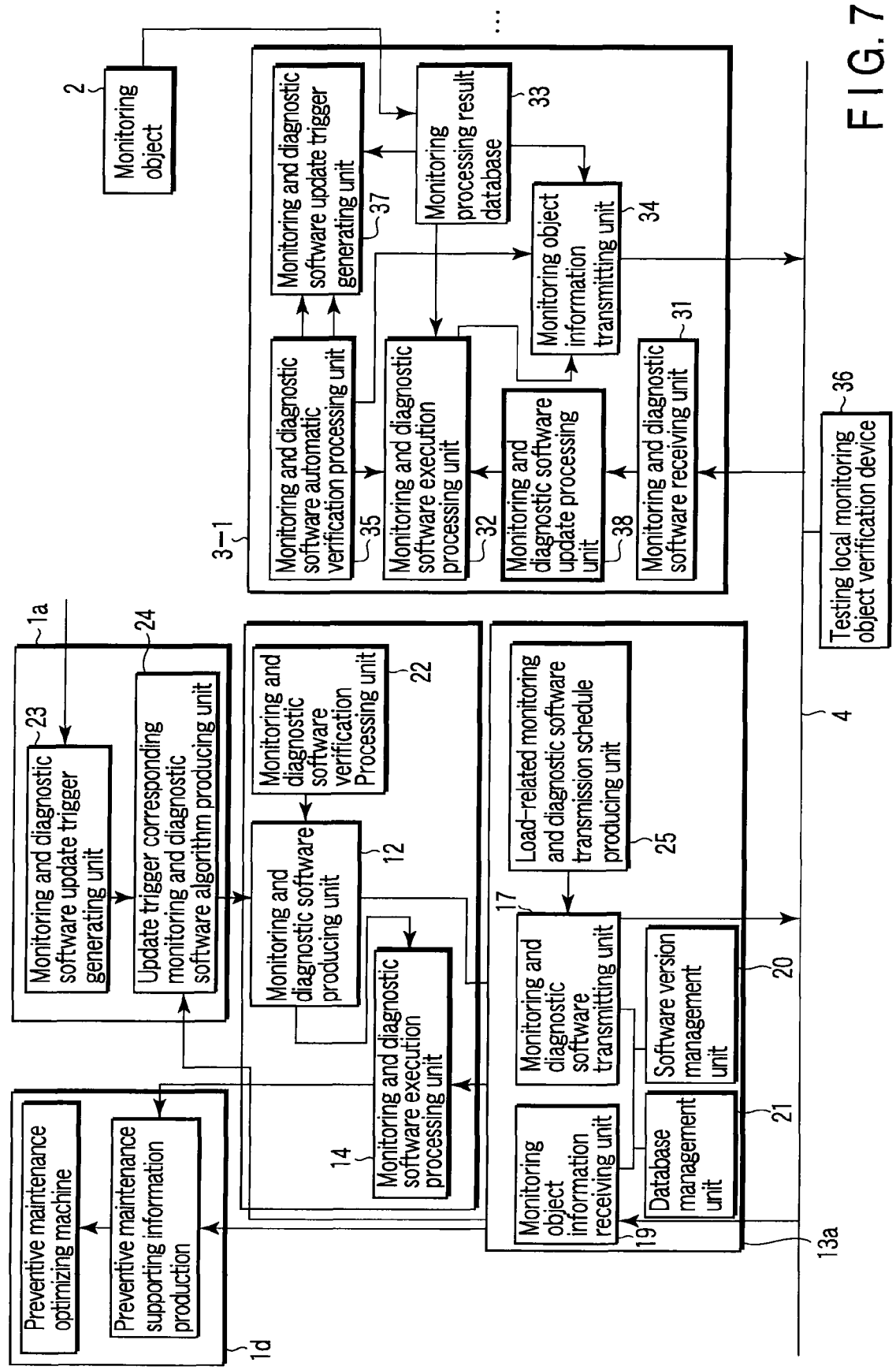
FIG. 7 is a block diagram showing a remote monitoring and diagnostic system according to a sixth embodiment of the invention.

FIG. 7 is a block diagram showing a remote monitoring and diagnostic system according to a sixth embodiment of the invention.

Although the configuration of the sixth embodiment is similar to that of the fifth embodiment, the configuration of the sixth embodiment differs particularly from that of the fifth embodiment in that the component corresponding to the center-side processing system 1 is realized by sharing the component corresponding to the center-side processing system 1 by plural computing machines.

Specifically, the center-side processing system 1 includes an algorithm producing computing machine 1a, a monitoring and diagnostic software producing computing machine 1b, a platform computing machine 1c, and a preventive maintenance supporting computing machine 1d.

In the algorithm producing computing machine 1a, the monitoring and diagnostic software update trigger generating unit 23 and the update trigger corresponding monitoring and diagnostic software algorithm producing unit 24 perform a series of pieces of processing.

In the monitoring and diagnostic software producing computing machine 1b, the pieces of processing associated with the monitoring and diagnostic software producing unit 12, the monitoring and diagnostic software execution processing unit 14, and the monitoring and diagnostic software verification processing unit 27 are performed.

The platform computing machine 1c has a configuration in which the pieces of processing associated with the platforms 3 and 3a are covered.

In the preventive maintenance supporting computing machine 1d, the preventive maintenance supporting information producing unit 15 and the preventive maintenance optimization processing unit 16 perform a series of pieces of processing.

Accordingly, in the sixth embodiment, when the component corresponding to the center-side processing system 1 is shared by the plural computing machines 1a to 1d to connect the plural computing machines 1a to 1d through the Intranet or the like, the necessary processing work can be advanced in each specialized section or specialized function. Additionally, the platform computing machine 1c performs the transmission of the software, the version management, the transmission and reception of information, and the database management, so that uniform management of information can be performed to manage efficiently the software and information.

The invention is not limited to the above-described embodiments, but various modifications can be made without departing from the scope of the invention.

The invention can be applied to the remote monitoring and diagnostic system which can previously verify the monitoring and diagnostic software, generate various update triggers under various conditions, and efficiently update the monitoring and diagnostic software even if many monitoring objects are connected.

What is claimed is:

1. A remote monitoring and diagnostic system in which a center-side processing system and a plurality of monitoring processing systems which monitor and diagnose monitoring objects are connected through a communication network to monitor and diagnose each monitoring object, wherein the center-side processing system includes:

first algorithm producing module for analyzing data and a specification relating to said each monitoring object to produce a monitoring and diagnostic algorithm of the monitoring object;

software producing module for producing monitoring and diagnostic software based on the produced monitoring and diagnostic algorithm, the monitoring and diagnostic software being used to monitor and diagnose said each monitoring object;

transmission schedule producing module for producing a transmission schedule in transmitting the produced monitoring and diagnostic software to the monitoring processing system;

transmitting module for transmitting the monitoring and diagnostic software to said each monitoring processing system through the communication network according to the transmission schedule, the monitoring processing system requiring the monitoring and diagnostic software;

receiving module for receiving monitoring data and diagnostic result of said each monitoring object from said each monitoring processing system, the monitoring data and diagnostic result being of result executed by the monitoring and diagnostic software; and second algorithm producing module for accepting the monitoring data and diagnostic result received by the receiving module, confirming the execution result of the monitoring and diagnostic software executed by said each monitoring processing system, and correcting and changing the monitoring and diagnostic software, and said each monitoring processing system includes:

receiving module for receiving the monitoring and diagnostic software transmitted from the transmitting module;

software execution processing module for executing the received monitoring and diagnostic software; and transmitting module for transmitting monitoring data and diagnostic result of said each monitoring object to the center-side processing system through the communication network, the monitoring data and diagnostic result being of result executed by the software execution processing module.

2. The remote monitoring and diagnostic system according to claim 1, wherein said each monitoring processing system includes automatic verification module for automatically verifying whether operation of the monitoring and diagnostic software executed by the software execution processing module becomes processing result of an unexpected malfunction, software falsification, or normal processing by imparting a predetermined test signal to the software execution processing module.

3. The remote monitoring and diagnostic system according to claim 2, wherein said each monitoring processing system includes an update trigger generating module for transmitting a trigger of update request for the monitoring and diagnostic software when it is determined that an update of the monitoring and diagnostic software is required according to at least one of following conditions (d) to (f) based on each of the monitoring data and diagnostic result of said each monitoring object which are the execution result of the software execution processing module and verification result of the automatic verification module:

(d) when adjustment of the monitoring and diagnostic software is required from the diagnostic result, (e) when a secular change is generated from the monitoring data, and (f) when it is verified from the verification result that the monitoring and diagnostic software is abnormal, and the center-side processing system includes update trigger corresponding algorithm producing module which takes place of the first algorithm producing module, the update trigger corresponding algorithm producing module producing a software updating algorithm when center-side processing system receives the trigger of the monitoring and diagnostic software update request from an update trigger generating module of said each monitoring processing system.

4. The remote monitoring and diagnostic system according to claim 1, wherein the center-side processing system includes:

monitoring and diagnostic software execution processing module for executing the monitoring and diagnostic software to supply monitoring and diagnostic result thereof, the monitoring and diagnostic software being produced by the software producing module based on the monitoring data and diagnostic result received by the receiving module, the center-side processing system requiring the monitoring and diagnostic software;

preventive maintenance supporting information producing module for receiving the monitoring data and diagnostic result transmitted from each monitoring processing system and producing maintenance supporting information on each monitoring object based on the monitoring data and diagnostic result and the monitoring and diagnostic result obtained by the monitoring and diagnostic software execution processing module; and preventive maintenance plan optimization processing module for making an optimum maintenance plan using the produced preventive maintenance supporting information.

5. The remote monitoring and diagnostic system according to claim 1, wherein the center-side processing system includes:

software version management module for managing a version of monitoring and diagnostic software when the transmitting module transmits the monitoring and diagnostic software; and retention management module for retaining and managing the monitoring data and diagnostic result from said each monitoring processing system, the monitoring data and diagnostic result being received by the receiving module of the center-side processing system.

6. The remote monitoring and diagnostic system according to claim 1, wherein the center-side processing system includes verification processing module for enabling appropriate monitoring and diagnostic software to be transmitted to said each monitoring processing system by verifying the monitoring and diagnostic software produced by the software producing module as a simulation basis in the center-side processing system before the monitoring and diagnostic software is transmitted to said each monitoring processing system or by verifying the monitoring and diagnostic software with a monitoring and diagnostic software verifying apparatus in which a local monitoring object real machine connected to the communication network is used.

7. The remote monitoring and diagnostic system according to claim 1, wherein the center-side processing system is a remote monitoring and diagnostic system,
the remote monitoring and diagnostic system including:
update trigger generating module for generating an update trigger when receiving a monitoring and diagnostic software update request based on at least one of following conditions (a) to (c),
(a) when a new diagnostic method is developed,
(b) when it is determined that an update is required based on a maintenance track record of the monitoring object,
(c) when a change is generated by increase or decrease in number of monitoring items or diagnostic items of the monitoring object; and
update trigger corresponding algorithm producing means for producing a software updating algorithm when receiving the update trigger.

8. The remote monitoring and diagnostic system according to claim 1, wherein the center-side processing system includes load-related transmission schedule producing module instead of the transmission schedule producing module, the load-related transmission schedule producing module producing update timing of the monitoring and diagnostic software in consideration of a load status or a stop time of said each monitoring object-side monitoring processing system to transmit the update timing to said each monitoring object-side monitoring processing system through the transmitting module when the many monitoring processing systems are connected to the communication network, and
said each monitoring object-side monitoring processing system includes software update processing module for accepting the monitoring and diagnostic software through the receiving module, monitoring and diagnostic software being transmitted from the center-side processing system through the communication network, and for updating the monitoring and diagnostic software of the software execution processing module based on the update timing of the monitoring and diagnostic software.

9. The remote monitoring and diagnostic system according to claim 1, wherein the load-related transmission schedule producing module of the center-side processing system determines timing at which the monitoring data and diagnostic result received from said each monitoring object-side monitoring processing system is transmitted to a component while considering the load status of the center-side processing system, the component requiring the monitoring data and diagnostic result, and
the load-related transmission schedule producing module transmits the monitoring data and diagnostic result to the component according to the determined timing.

10. The remote monitoring and diagnostic system according to claim 1, wherein the center-side processing system is divided into an algorithm producing system including an update trigger generating system, a monitoring and diagnostic software producing, executing, and verifying system, a transmission, reception, and management system including the transmission schedule, and a preventive maintenance system, and
each of the algorithm producing system including the update trigger generating system, the monitoring and diagnostic software producing, executing, and verifying system, the transmission, reception, and management system, and the preventive maintenance system includes an individual computing machine.

11. The remote monitoring and diagnostic system according to claim 1, wherein the monitoring and diagnostic software is produced as an agent.

* * * * *